(No Model.)
R. WIND.
COMBINED POWDER RECEPTACLE AND MEASURE.
No. 533,834. Patented Feb. 5, 1895.
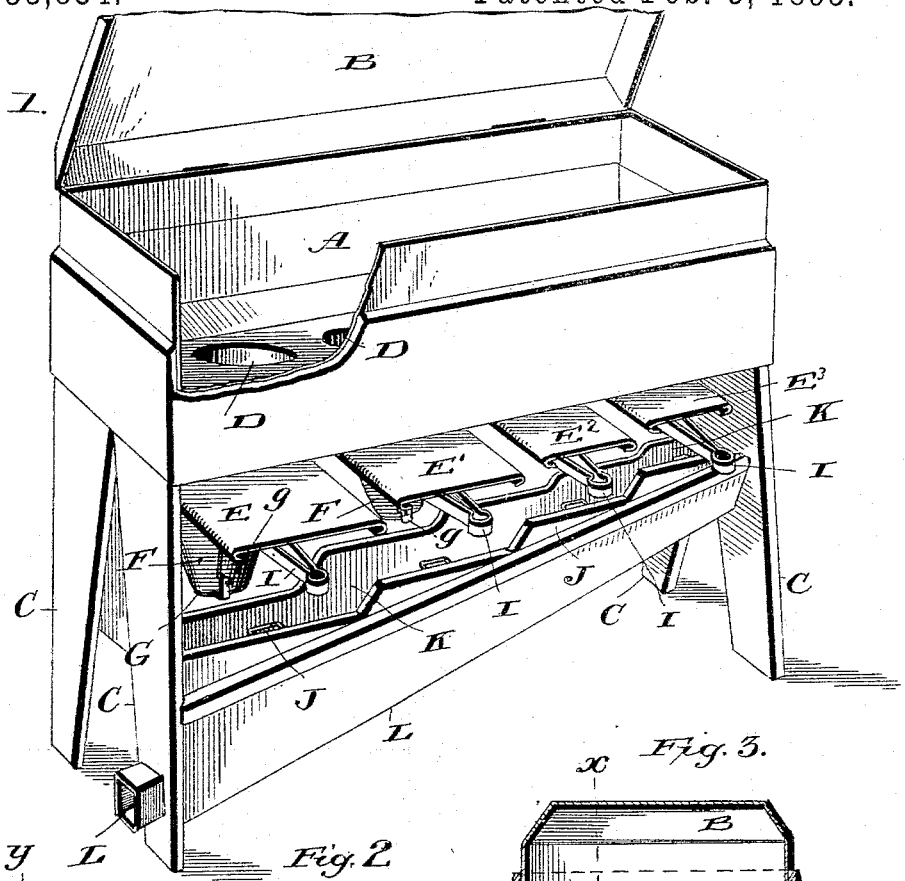
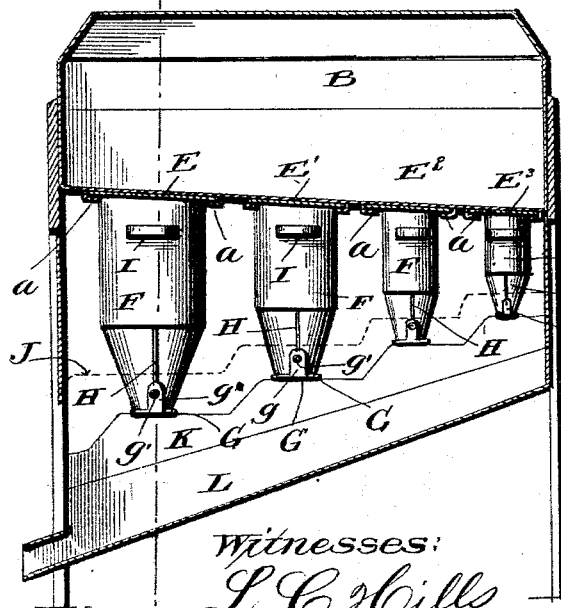
Witnesses:
L. C. Hills
A. L. Hough
Inventor:
Robert Wind,
by Franklin H. Hough
Atty.

UNITED STATES PATENT OFFICE.

ROBERT WIND, OF TALBOTTON, GEORGIA, ASSIGNOR, BY DIRECT AND MESNE ASSIGNMENTS, TO FRANKLIN H. HOUGH, OF WASHINGTON, DISTRICT OF COLUMBIA, AND EDWARD C. GOODWIN, OF WORCESTER, MASSACHUSETTS.

COMBINED POWDER RECEPTACLE AND MEASURE.

SPECIFICATION forming part of Letters Patent No. 533,834, dated February 5, 1895.

Application filed March 13, 1894. Serial No. 503,458. (No model.)

*To all whom it may concern:*

Be it known that I, ROBERT WIND, a citizen of the United States, residing at Talbotton, in the county of Talbot and State of Georgia, have invented certain new and useful Improvements in a Combined Powder Receptacle and Measure; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in apparatus for storing in bulk and delivering in smaller predetermined quantities, shot, powder and other like substances.

The invention has particular reference to that class of receptacles which are designed for use in stores, in retailing powder, and it has for its object, among others, to provide a suitable storage chamber with a series of outlet openings in its bottom, through which outlets the powder is delivered into measures which are attached to movable slides, the lower ends of the measures being provided with automatically actuated valves, which, when the slides have been moved outward will open and deliver the contents of the measures into a common chute, through which it passes to the point at which it is to be delivered.

To these ends and to such others as the invention may pertain the same consists in the peculiar construction, and in the novel arrangement and combination of parts, all as more fully hereinafter described, shown in the accompanying drawings, and then specifically defined in the appended claims.

The invention is clearly illustrated in the accompanying drawings, which, with the letters of reference marked thereon form a part of this specification, like letters of reference indicating the same parts throughout the several views, and in which drawings—

Figure 1, is a perspective view of my device, with parts broken away in order to more clearly illustrate the construction. Fig. 2, is a section upon the line $x$, $x$ of Fig. 1. Fig. 3 is an enlarged detail in perspective of the lower end of one of the measures, showing the valve and its connections.

Reference now being had to the details of the drawings by letter A designates the storage chamber, which is provided with a suitable cover B, and supporting legs C, C.

The bottom of the storage chamber is provided at intervals of its length with openings D, D, and beneath the bottom of the said chamber and movable within suitable guides $a$, $a$, are a series of slides E, E', $E^2$ and $E^3$. Each of said slides carries a measure F, the upper open end of which is adapted to register with an opening in the bottom of the storage chamber, when the slide is moved inward. The lower end of each of the measures is hopper shaped, as shown, and hinged to one side of the opening in the bottom of the outlet of the measure, is a valve G, which when closed closes the said outlet. The edge of the valve opposite to that which is hinged, is provided with a spring arm G', the end of which arm extends vertically as shown at $g$, and is provided with an opening $g'$ with which the end of the spring wire latch H engages.

Each of the measures is provided with a handle I by which the measure, with its attached slide may be moved in or out, as may be desired, and stops J and K are provided for automatically opening and closing the valves G, as shown; the valve being opened by the engagement of the latch H with the stop J, and closed by the contact of the said valve with the stop K, in the return movement of the slide.

It is my purpose to provide a common chute L into which the several measures will deliver their contents.

Having thus described my invention, what I claim to be new, and desire to secure by Letters Patent, is—

1. In combination with the slide, the measure carried thereby, the operating handle connected therewith the outlet opening in the measure provided with a hinged valve, the spring latch and catch for securing the valve, and stops arranged in the path of the latch and valve respectively and adapted to open and close the valve by contact in the movement of the slide, substantially as described and for the purpose specified.

2. In combination with a storage chamber having its bottom provided with a series of slides each carrying a measure registering with an opening in the chamber and each having an outlet controlled by a hinged valve and connections between said valve and stops arranged in their paths whereby the valves will be operated automatically in moving the slides, of a chute adapted to serve as a delivery outlet from all of the measures, substantially as described.

In testimony whereof I affix my signature in presence of two witnesses.

ROBERT WIND.

Witnesses:
 JOHN H. MCGEHEE,
 W. J. RAINES.